2 Sheets Sheet 2.

Wm. H. Elton.     *Coffee Cleaner.*

102,519

Witnesses:     Inventor:

UNITED STATES PATENT OFFICE.

WILLIAM H. ELTON, OF BALTIMORE, MARYLAND.

IMPROVEMENT IN COFFEE-CLEANING MACHINES.

Specification forming part of Letters Patent No. 102,519, dated May 3, 1870.

*To all whom it may concern:*

Be it known that I, WILLIAM H. ELTON, of Baltimore city, in the State of Maryland, have invented certain new and useful Improvements in Coffee-Cleaning Machines, of which the following is a full, clear, and exact description.

My invention relates to a machine of the class having a revolving horizontal cylinder in which the coffee is cleaned.

My improvements consist, first, in a revolving imperforate horizontal cylinder provided with short ribs or teeth projecting from its inner circumference and perforated heads, as hereinafter fully described; second, in the combination of the cylinder, its teeth, the perforated heads, and openings between the peripheries of the heads and the inner sides of the ends of the cylinder, as hereinafter fully described.

Figure 1:
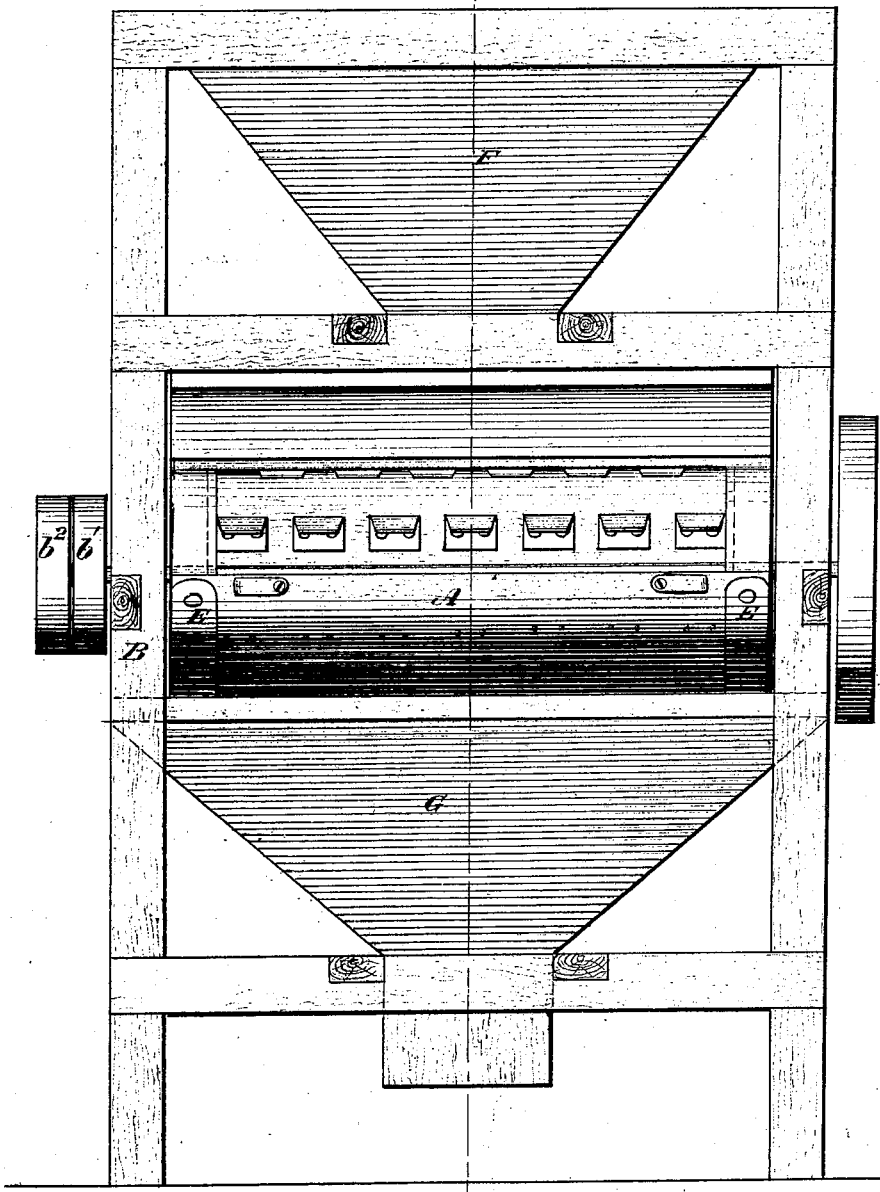
Figure 2:
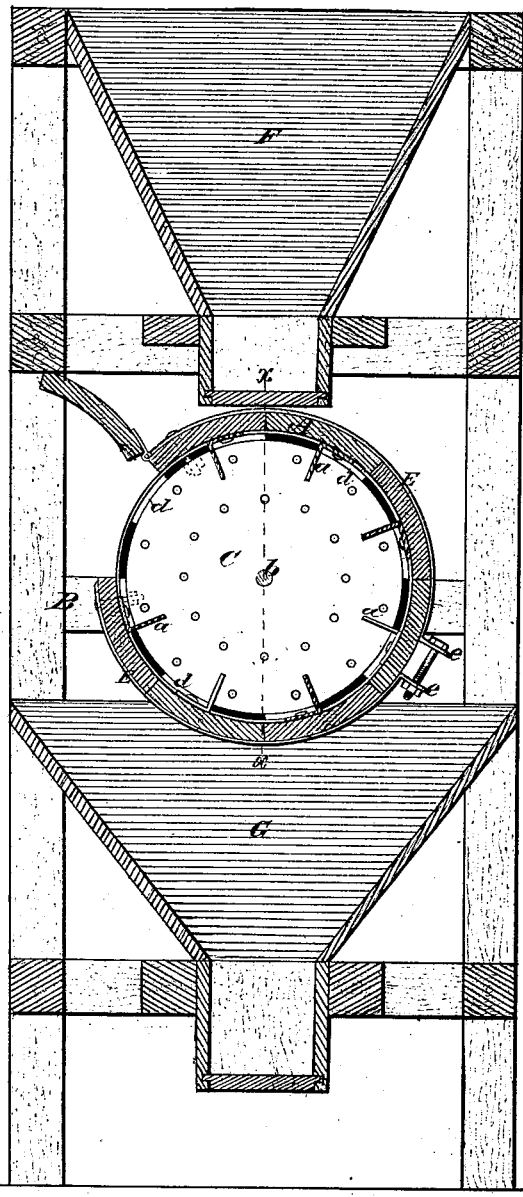
Figure 3:
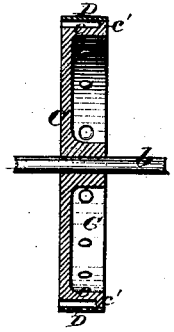

In the accompanying drawings, Figure 1 represents a front elevation of my improved machine with the cylinder-door open; Fig. 2, a vertical central section through the same, and Fig. 3 a vertical section through one of the heads at the line $x\ x$ of Fig. 2.

A cylinder, A, composed of wooden staves, and having small ribs or teeth $a$ upon its inside, is secured by means of its heads C to a shaft, $b$, which is revolved in proper bearings in a stout frame, B, by a band passing around a band-wheel, $b'$, and driven by suitable means. The heads C of the cylinder are of metal, having numerous small openings, and each having a flange, $c$, provided with projections or shoulders $c'$ at regular intervals. A hoop, D, fits around each head, resting on the shoulders $c'$, and is secured in place by bolts passing through the hoop and flanges $c$. These hoops form supports for the ends of the staves of the cylinder. The spaces between the shoulders $c'$ form openings $d$ between the hoops and heads.

A binding-band, E, for each end of the cylinder is made in two parts, each bent at one end, $e$. The bands rest upon the staves, and are secured to the heads and hoops by bolts and nuts. They are caused to clamp the staves tightly by nuts or bolts passing through their bent ends $e$, thus holding the staves firmly in place.

A hopper, F, is secured in the frame above the cylinder, and another hopper, G, is fixed beneath the cylinder. Each hopper is provided with a suitable sliding gate or shut-off.

The coffee to be cleaned is placed in the upper hopper, the door of the cylinder opened, and the cylinder brought to the proper position to receive the coffee from the hopper. When the desired quantity of coffee has run into the cylinder the slide-gate is closed, the cylinder-door fastened, and the machine set in motion. As the cylinder revolves the coffee is thoroughly agitated by the teeth $a$ and rubbed by contact with them and the cylinder. Dust and trash pass out through the openings in the heads and the circumferential openings $d$. The coffee, when cleaned, is discharged into the lower hopper, the revolution of the machine having been stopped by shifting the driving-band to the loose wheel $b^2$, and a fresh supply is then received into the cylinder from the upper hopper.

What I claim is—

1. The combination of the imperforate cylinder, the teeth, and the perforated heads, all these parts being constructed to operate in combination, as set forth.

2. The combination, with the cylinder, of the heads, constructed as described, with apertures between the peripheries of the heads and the cylinder.

In testimony whereof I have hereunto subscribed my name.

WM. H. ELTON.

Witnesses:
WM. F. HYNTON,
J. R. BILLINGS.